United States Patent [19]

Kimura et al.

[11] Patent Number: 5,473,009

[45] Date of Patent: Dec. 5, 1995

[54] MOLD MATERIAL COMPOSITION AND METHOD FOR PREPARING MOLD

[75] Inventors: Tadashi Kimura; Osamu Ishizu, both of Yokohama; Shin Konishi, Fujisawa, all of Japan

[73] Assignee: Nippon Polyurethane Industry Co., Ltd., Tokyo, Japan

[21] Appl. No.: 197,953

[22] Filed: Feb. 17, 1994

[30] Foreign Application Priority Data

Jul. 22, 1993 [JP] Japan .................................. 5-181365

[51] Int. Cl.$^6$ ............................ C08L 75/08; C08K 3/36
[52] U.S. Cl. ...................... 524/590; 524/595; 524/874; 523/142; 523/143; 523/144
[58] Field of Search .................................. 523/142, 143, 523/144; 524/590, 595, 874

[56] References Cited

U.S. PATENT DOCUMENTS

| | | | |
|---|---|---|---|
| 3,645,942 | 2/1972 | Brown | 523/142 |
| 4,273,700 | 6/1981 | Kho | 523/142 |
| 4,293,480 | 10/1981 | Martin et al. | 523/142 |
| 4,775,704 | 10/1988 | Nagahori et al. | 523/143 |

FOREIGN PATENT DOCUMENTS 3-189048  8/1991  Japan .

*Primary Examiner*—Paul R. Michl
*Assistant Examiner*—Olga Asinovsky
*Attorney, Agent, or Firm*—Davis Hoxie Faithfull & Hapgood

[57] ABSTRACT

A self-hardening mold material composition comprising 100 parts by weight of molding sand, 0.1 to 6 parts by weight of a component (a), 0.1 to 4 parts by weight of a component (b), 0.05 to 2.0 parts by weight of a component (c) as $SiO_2$, and 0.01 to 0.5 parts by weight of a component (d) on the basis of 100 parts by weight of the component (b), wherein the component (a) is an organic polyisocyanate having at least two isocyanate groups; the component (b) is a polyetherpolyol mixtures comprising aminopolyetherpolyol, obtained by addition reaction of aliphatic or aromatic amine with alkylene oxide, and a non-aminopolyetherpolyol and containing 5 to 85% by weight of primary hydroxyl-containing polyetherpolyol, the component (c) is at least one of silicate ester, its hydrolysis products, a water dispersion-type silica sol and an alcohol dispersion-type silica sol; and the component (d) is a reaction catalyst, can produce a mold having a good strength after being left standing in the atmosphere at the ordinary temperature and after a molten metal is poured therein, a good shake-out when the mold is dismantled, without any need for mold wash at all or with a need only for simple mold wash.

4 Claims, No Drawings

1

MOLD MATERIAL COMPOSITION AND METHOD FOR PREPARING MOLD

BACKGROUND OF THE INVENTION

1. Field of the Invention

The present invention relates to a mold material composition for preparing a mold (sand mold) and a method for preparing a mold from said mold material composition, and more particularly to a material composition for a self-hardening mold having a good strength particularly after being left standing in the atmosphere at the ordinary temperature and when molten metal is poured therein, a good susceptibility to disintegration or shake-out in spite of the good strength, requiring no mold wash at all or a very simple mold wash such as spraying, and to a method for preparing a mold from said material composition.

2. Related Background Art

A self-hardening mold for preparing a casting sand mold for use in the production of various metal casting products (which will be hereinafter referred to as "mold" or "sand mold") includes an organic binder-based self-hardening mold and an inorganic binder-based self-hardening mold. Known methods based on the organic binder include, for example, a method comprising condensation curing a furan resin as a binder with a strongly acidic hardening agent such as toluenesulfonic acid (Furan method), a method comprising mixing such three components as phenol resin, polyisocyanate and a basic catalyst with molding sand and hardening the phenol resin through the urethanization reaction with the polyisocyanate by the catalyst (Pepset method), a method comprising mixing such three components as an oil-modified alkyd resin, polyisocyanate and a catalyst, for example, a metal naphthenate, with mold sand, followed by hardening through the urethanization reaction (Linocure method), etc.

Known methods based on the inorganic binder include, for example, a method for preparing a mold by solidifying mold sand by cement (OJ process), a method for hardening a sand mold containing sodium silicate by introducing a $CO_2$ gas thereto under pressure ($CO_2$ method), etc.

Known mold material compositions for a casting sand mold capable of undergoing casting without any mold wash include, for example, a mold sand composition comprising a furfuryl alcohol condensate, polyester resin, etc.; a hardening agent for curing the resin such as toluene sulfonic acid, etc; a ceramic component such as silicate ester, etc.; an isocyanate-based hardening agent for curing the ester; a fine refractory powder for preventing penetration such as alumina, silica, etc.; a heat resistance intensifier such as sodium chloride, borax, etc.; a molding-improving agent such as sugars, dextrin, etc.; and a graphite speroidization stabilizer such as iron oxide, magnesium oxide, etc. (U.S. Pat. No. 4,775,704), etc.

However, the Furan method uses a strongly acidic hardening agent and thus has such problems as corrosion of casting product surfaces by the remaining acid, slow hardening at the inside of the mold not in contact with air (slow development of mold strength in the deep region), large dependence of hardening time upon the ambient temperature, generation of acidic gas when a molten metal is poured into the mold, resulting in deterioration of working environments, etc. The Pepset method has such problems as a large change in the hardening speed when the kind of sand or ambient temperture is largely changed, and generation of visible smokes (which will be hereinafter referred to as "smokes") when the mold in dismantled. The Linocure method has such problems as somewhat poor mold strength (which will be hereinafter referred to as "mold strength at an elevated temperature") when a molten metal is poured in the mold.

All the molds prepared by using the organic binder generally have poor mold strength at an elevated temperature, and binding forces among the sand grains are decreased due to the combustion of the organic binder when a molten metal is poured into the mold, and surface defects are liable to generate due to penetration of the molten metal into crevices among the sand grains. To prevent the penetration, a mold wash agent containing graphite, quartz powder, etc. as main ingredients must be applied to the parts of a mold in contact with the molten metal.

On the other hand, molds prepared by using the inorganic binder are not susceptible to penetration, but the mold strength after the mold is left standing at the ordinary temperature in the atmosphere for a given time (which will be hereinafter referred to as "mold strength after being left standing") is poor and furthermore a fusion-penetration phenomenon, i.e. melt fusion of the metal onto the mold, is liable to appear. To prevent these adverse phenomena, wood sawdusts, coke powder, etc. must be added to the sand and also a mold wash agent must be applied to the mold.

In any case, a mold wash agent must be used, and the cost of mold wash agent application amounts to 30–50% of the total cost of mold preparation and thus the mold wash agent application is a main cause for mold costup.

In case of the mold material composition for casting sand mold, which is said to be applicable to casting without any mold washing, as disclosed in U.S. Pat. No. 4,775,704, the mold preparation process is very complicated because of use of many binder components such as fine refractory powder for preventing the penetration, a mold-intensifying agent for elevated temperatures etc., and the mold prepared by using these binders has such problems as prolonged hardening time and considerably retarded development of mold strength. Thus, it is practically difficult to use the mold material composition without any use of mold wash.

Known attempts to reduce the kinds of binder components include, for example, a method using silicate polyol having a hydroxyl value of 200 to 1,500 obtained by reaction of tetraalkoxysilane or its hydrolyzed, dehydrated polycondensate (silicate oligomer) having a hydrolysis ratio of not more than 50% with polyol having two functional groups, a urethanization catalyst, and polyisocyanate (JP-A-Hei3-189048). However, synthesis of silicate polyol is complicated, and the silicate content of the binder component is so low due to the inclusion of silicate into the polyol that no satisfactory mold strength at an elevated temperature can be obtained yet.

SUMMARY OF THE INVENTION

As a result of extensive studies, the present inventors have found that the foregoing problems could be solved by use of a mold material composition which comprises molding sand, a binder, etc., in which the composition contain molding sand, (a) an organic polyisocyanate component, (b) an OH-containing component, (c) a ceramic component and (d) a reaction catalyst, and have established the present invention.

According to the present invention, there is provide a mold material composition, which comprises 100 parts by weight of molding sand, 0.1 to 6 parts by weight of a component (a), 0.1 to 4 parts by weight of a component (b), 0.05 to 2.0 parts by weight of component (c) as $SiO_2$, and 0.01 to 0.5 parts by weight of a component (d) on the basis of 100 parts by weight of the component (b), wherein the component (a) is an organic polyisocyanate having at least two isocyanate groups; the component (b) is a polyetherpolyol mixtures having a hydroxyl value of 350 to 1,600, comprising aminopolyetherpolyol having a hydroxyl value of 400 to 1,600 and 2 to 6 functional groups, obtained by addition reaction of aliphatic or aromatic amine with alkylene oxide and a non-amino polyetherpolyol having a hydroxyl number of 100 to 800 and 2 to 8 functional groups, the polyetherpolyol mixture contains 5 to 80% by weight of aminopolyetherpolyol, 95 to 20% by weight of non-aminopolyetherpolyol and 5 to 85% by weight of primary hydroxyl-containing polyetherpolyol, where the content of primary hydroxyl-containing non-aminopolyetherpolyol in the component (b) is at least 5% by weight; the component (c) is at least one of silicate ester, its hydrolysis products, a water dispersion-type silica sol and an alcohol dispersion-type silica sol; and the component (d) is a reaction catalyst.

The present invention also provides a method for preparing a mold from the above-mentioned mold material composition.

DETAILED DESCRIPTION OF THE PREFERRED EMBODIMENTS

Molds prepared from the present mold material composition have a good mold strength after being left standing in the atmosphere at the ordinary temperature and also after a molten metal is poured therein, a less susceptibility to mold disintegration and an easy mold handling during the casting operation and a good disintegratability or shake-out after the casting without any need for the mold wash at all or only with a need for a very simple mold wash such as spraying.

The organic polyisocyanate in the component (a) for use in the present invention can form polymers through reaction with the polyol in the component (b). Furthermore, the organic polyisocyanate acts as an agent for removing the alcohol from the silicate ester, the water or alcohol from the hydrolysis products of the silicate ester, and the water or alcohol from the silica sol in the component (c).

The water or alcohol contained in the silicate ester or its hydrolysis products, water dispersion type silica sol and alcohol dispersion-type silica sol lowers the hardening speed of the binder and also the mold strength after being left standing. Thus, the organic polyisocyanate in the component (a) can remove the water or alcohol from the mold interior through the reaction and hardening with the water or alcohol, thereby playing a role of fully obtaining the hardening speed of the binder and the mold strength after being left standing.

The component (b) for use in the present invention can not only improve the mold strength after being left standing considerably, but also considerably prevent fusion-penetration to the mold by a molten metal. Furthermore, inclusion of aminopolyetherpolyol and primary hydroxyl-containing non-aminopolyetherpolyol can considerably improve the hardening speed. Furthermore, use of aliphatic polyetherpolyol as a non-aminopolyetherpolyol can considerably reduce generation of smokes and disagreeable odor during the casting of molten metal and dismantling of the mold.

Finely granular silica provided by the component (c) has such characteristics as to enable sintering between sand grains at 800°–850° C. and melting therebetween at 1,000°–1,200° C., thereby obtaining stronger melt-bonding therebetween, and thus the component (c) is very effective as a binder in an elevated temperature region and can improve the mold strength at elevated temperatures considerably. Furthermore, the component (c) can prevent penetration of molten metal and save or simplify the mold wash operation.

The component (a) for use in the present invention includes, for example, aliphatic polyisocyanates such as hexamethylenediisocyanate, etc.; aromatic polyisocyanates such as tolylenediisocyanate, xylylenediisocyanate, diphenylmethanediisocyanate, naphthalenediisocyanate, etc.; alicylic polyisocyanates such as isophoronediisocyanate, etc.; crude aliphatic, alicyclic and aromatic polyisocyanates such as crude tolylenediisocyanate, crude diphenylmethanediisocyanate (also called "polymethylene-polyphenylpolyisocyanate"), etc.; and modified aliphatic, alicyclic and aromatic polyisocyanates such as carbodiimide-modified diphenylmethanediisocyanate, isocyanurate-containing diphenylmethanediisocyanate and polyolmodified diphenylmethanediisocyanate, and any organic polyisocyanates can be used, so long as they can react with water and alcohol to make the ceramic component effective and react with the component (b) to form polyurethane. It is preferable to use organic polyisocyanates having 2 to 6 isocyanate groups, and it is not objectionable to use at least two thereof in mixture. Preferable polyisocyanate is an aromatic polyisocyanate, and particularly crude diphenylmethane-diisocyanate or its modified ones are preferable from the viewpoints of vapor pressure, reactivity and cost.

A mixing ratio of the component (a) to the mold sand is preferably 0.1 to 6% by weight. Below 0.1% by weight, the hardening of the component (b) is not satisfactory and the action to remove water or alcohol from the component (c) is also not satisfactory. That is, no desired effects on the hardening and the removal can be obtained, and no satisfactory hardening speed of the binder and mold strength after being left standing can be maintained. Above 6% by weight, on the other hand, the hardening speed is so high that no smooth mold-forming operation can be continued, and the disintegratability and shake-out are lowered.

The component (b) for use in the present invention can be obtained through the addition reaction of aliphatic or aromatic amine with alkylene oxide and is a polyetherpolyol mixture having a hydroxyl value of 350 to 1,600, comprising aminopolyetherpolyol having a hydroxyl number of 400 to 1,600 and non-aminopolyetherpolyol, and contains 5 to 85% by weight of primary hydroxyl-containing polyetherpolyol. By inclusion of aminopolyetherpolyol and primary hydroxyl-containing non-aminopolyetherpolyol 1 the hardening speed can be considerably improved. Furthermore, use of non-aminopolyetherpolyol and aliphatic polyetherpolyol can considerably reduce generation of smokes and disagreeable odor during the casting of molten metal and the dismantling of the mold. When the content of primary hydroxyl-containing polyetherpolyol is in a range of 5 to 85% by weight, the component (b) can further contain non-aminopolyetherpolyol containing no primary hydroxyls.

As aminopolyetherpolyol, aliphatic or aromatic amines, preferably aliphatic amines bonded with alkylene oxide, for example, ethylene oxide, propylene oxide, etc. can be used. As alkylene oxide, at least one of ethylene oxide and propylene oxide can be used. The hydroxyl number of the aminopolyetherpolyol is 400 to 1,600, preferably 450 to 1,250, and the number of functional group is 2 to 6, preferably 2 to 4. When the hydroxyl number is less than 400, no appropriate reaction rate is obtained, whereas above 1,600 the reaction proceeds too rapidly and no smooth mold-forming operation can be carried out. When the number of functional group is less than 2, no polyurethane resin with satisfactory cross-linking with the component (a) can be formed, and thus no satisfactory mold strength can be obtained. When the number of functional group exceeds 6, cross-linking proceeds excessively, resulting in lowering of disintegratability of the mold and shake-out.

Aminopolyetherpolyol has a higher reactivity with isocyanate groups than non-aminopolyetherpolyol, and thus aminopolyetherpolyol can contain primary hydroxyls or no primary hydroxyls. When aminopolyetherpolyol containing primary hydroxyls is used, total content of it and non-aminopolyetherpolyol containing primary hydroxyls in the component (b) must be not more than 85% by weight. Content of aminopolyetherpolyol in the component (b) may be 5 to 80% by weight, preferably 10 to 50% by weight.

As non-aminopolyetherpolyol, polyetherpolyol having a hydroxyl value of 100 to 800 and 2 to 8 functional groups can be used. Preferably primary hydroxyl-containing polyetherpolyol having a hydroxyl value of 200 to 600, more preferably aliphatic polyetherpolyol having a hydroxyl value of 200 to 600 can be used. Content of primary hydroxyl-containing non-aminopolyetherpolyol in the component (b) is so selected as to be at least 5% by weight and that of primary hydroxyl-containing polyetherpolyol in the component (b) is so selected as to be 5 to 85% by weight. If the primary hydroxyl-containing polyetherpolyol is within a range of 5 to 85% by weight, the component (b) can further contain non-aminopolyetherpolyol containing no primary hydroxyls.

A mixing ratio of aminopolyetherpolyol to non-aminopolyetherpolyol by weight is 5: 95 to 80: 20, preferably 10: 90 to 50: 50. When the aminopolyetherpolyol is in a ratio by weight of less than 5, the hardening speed of the mold is low, whereas in a ratio by weight of more than 80, generation of smokes and disagreeable odor is vigorous during the casting of molten metal and dismantling of the mold. Aminopolyetherpolyol and non-aminopolyetherpolyol of the component (b) can be mixed together in advance, or these two components can be mixed with sand separately.

Preferably 0.1 to 4% by weight of the component (b), based on the mold sand, is used. Below 0.1% by weight, no satisfactory hardening speed of the binder and no satisfactory mold strength after being left standing can be maintained, whereas above 4% by weight the disintegratability and shake-out are lowered.

The component (a) and the component (b) can be used as they are, or can be used after mixing with solvents or solvent mixture for the component (a) and the component (b), respectively. For example, the solvents include cyclic carbonates represented by ethylene carbonate, propylene carbonate, etc.; dialkyl carbonates represented by dimethyl carbonate, diethyl carbonate, etc.; hydrocarbon solvents such as benzene, toluene, xylene, solvent naphtha, terpene, etc.; dibasic acid esters such as dimethyl adipate, methyl glutarate, etc.; coupling solvents (which means solvents capable of making compatible two or more liquids that are hard or unable to be compatilible with one another) such as furfural, cellosolve, glycol diacetate, butylcellosolve acetate, isophorone, etc., and can be used alone or in mixture thereof.

The component (c) for use in the present invention is at least one of silicate ester or its hydrolysis products, water dispersion-type silica sol and alcohol dispersion-type silica sol., among which particularly methyl silicate (methyl silicate ester), ethyl silicate, propyl silicate, butyl silicate, or their polymers such as trimer to hexamer, or their mixture are preferable as the silicate ester. Furthermore, silicate ester hydrolysis products obtained by hydrolysis of silicate ester by water, an aqueous acid solution or an aqueous hydrochloric acid solution containing alcohol can be also used as the silicate ester.

Water or alcohol dispersion type silica sol for use in the present invention is a silica sol prepared by dispersing fine silica powder having a particle size of not more than 20 μm into water,. alcohol such as ethanol or an aqueous alcohol solution. Preferably 0.05 to 2.0% by weight of the ceramic component, based on the mold sand, is used in terms of silica in the ceramic component. When the amount of the silica ($SiO_2$) is less than 0.05% by weight, no desired effects can be obtained, whereas above 2.0% by weight the disintegratability of the mold is lowered during the dismantling of the mold.

The component (d) for use in the present invention includes reaction catalyst usually used in the production of urethane resin, for example, an amine catalyst such as triethylenediamine, and diethylamine, a DBU-based catalyst such as 1,8-bicyclo (5, 4, 0)undecene-7 (which will be hereinafer referred to DBU) and its salts, a morpholine-based catalyst such as N,N-dimethylcyclohexylamine and N-methylmorpholine, an alkanol-amine-based catalyst such as N,N-diethylethanolamine, and a metal catalyst such as stannous octoate and dibutyltin dilaurate. 0.01 to 5.0% by weight of the component (d) is used on the basis of the component (b). Below 0.01% by weight, no satisfactory hardening speed can be obtained, whereas above 5.0% by weight the hardening speed is too high to conduct smooth mold-forming operation. The component (d) can be added alone to the mold sand, but it is convenient from the viewpoint of operation to mix the component (d) with the component (b) in advance and use the resulting mixture. Aminopolyetherpolyol and non-aminopolyetherpolyol of the component (b) can be mixed with the component (d) separately.

A mold can be prepared from the components (a), (b), (c) and (d) according to the ordinary method for preparing sand molds. That is, mold sand is charged into a mixer, and the components (a), (b), (c) and (d) are added thereto successively in any desired order, while stirring the mold sand and stirred for a desired period of time, and discharged from the mixer. A mold is prepared with the thus obtained sand mixture within a workable time. As a mixer, a high speed mixer or a continuous mixer is preferable.

Molds for producing various metal castings, prepared from the present mold material composition, have a good mold strength at elevated temperatures and after being left standing, a less mold disintegratability during the casting operation and an easy mold handling, without any fusion-penetration and penetration phenomena of molten metal during the casting, and a good disintegratability and shake-out after the casting. Molds prepared from the present mold material composition have such good mold properties as mentioned above without any need for mold wash, which has been so far inevitable, at all or with a need for very simple mold wash. Thus, the present invention can enhance the productivity in the mold preparation and can contribute to large cost reduction and thus can provide industrially useful effects.

The present invention will be described in detail below, referring to Examples and Comparative Examples, which are not limitative of the present invention, where % is by weight.

The following materials are used for preparing a mold material composition and are identified by symbols given in parentheses in the following description:

(1) Component (a):
  Crude diphenylmethane diisocyanate (MR-200)
  Tolylene diisocyanate (T-80)
  (Both are made by Nippon Polyurethane Chem. Ind. Co., Ltd., Japan)

(2) Component (B):
  GP-250 : glycerine PO adduct, OHV=670 (P-1)
  GP-400: glycerine PO adduct, OHV=400 (P-2)
  AP-169: triethanolamine PO adduct, OHV=1000 (P-3)
  AP-350: triethanol amine PO adduct, OHV=480 (P-4)
  TE-300: trimethylolpropane EO adduct, OHV=560 (P-5)
  (All of the foregoing products are polyether polyols made by Sanyo Chem. Ind., Japan)

(3) Component (c):
  Methyl silicate (SI-1)
  Ethyl silicate (SI-2)
  Alcohol dispersion type silica sol (SI-3)
  Water dispersion type silica sol (SI-4)
  (All of the foregoing products are products made by Colcoat K.K., Japan)

(4) Component (d):
  N,N-dimethylethanolamine (DMEA)
  N,N-diethylethanolamine (DEEA)
  (The foregoing two products are made by Nihon Nyukazai K.K., Japan)
  Solution of triethylenediamine in dipropylene glycol (TEDA) (product made by Tosoh K.K., Japan)

(5) Solvent:
  DBAM (SOL-1) (dibasic acid-mixed ester, made by Sanken Kako K.K., Japan)
  Shellsol A (SOL-2) (aromatic petroleum-based solvent, made by Shell Japan K.K., Japan)

Comparative Test Materials
  Kao Lightner 340 B (R-1) (urea-formaldehyde modified furfuryl alcohol resin, made by Kao-Quaker K.K., Japan)
  Sodium silicate (R-2) (water glass: molar ratio ($SiO_2$/$Na_2O$)=2.6, Baumé degree=45°)
  Toluenesulfonic acid (TS)
  Alumina (fine refractory powder; average particle size=5 μm) (T-1)
  Magnesium oxide (graphite spheroidization stabilizer; average particle size=10 μm) (T-2)
  Boric acid (mold-intensifying agent for elevated temperatures; average particle size=10 μm) (T-3)
  Dextrin (molding improving agent) (T-4)

Molds were prepared according to the following procedures:

EXAMPLES 1 TO 18

Component (b) mixed with comopnent (d) in advance and diluted with a solvent, component (c), and component (a) diluted with a solvent were each adjusted to 20° C. Then, Fremantle sand (20° C.) was placed in a high speed mixer (MS-IP, trade-mark of Taiyo Chuki K.K., Japan), and the component (b), the component (c) and the component (a) each adjusted to 20° C., were added thereto in this order while rotating the mixer. 30 seconds after the stirring, 20 Kg of the resulting mold sand mixture was packed around a pattern (in a rectangular trapezoidal shape with such dimensions as bottom surface: 11×16 cm, top surface: 9×15 cm and height: 8 cm) in a metal flash with such inside dimensions as width: 21 cm, length: 29 cm and height: 12 cm, placed on a platen, thereby forming a mold. Then, the solidified mold was taken out. The kinds and amounts of components used are shown in Tables 1 to 6.

Comparative Example 1

The same Fremantle sand as used in Example 1 was placed in a high speed mixer, and then toluenesulfonic acid as a hardening agent and then ureafuran resin as an organic binder were added to the sand, while rotating the mixer. 30 second after the stirring, 20 Kg of the resulting mold sand mixture was formed into a mold under the same conditions as in Example 1 (the mold will be hereinafer referred to as Conventional mold 1). Kinds and amount of the binder and the hardening agent used are shown in Table 7.

Comparative Example 2

The same Fremantle sand as used in Example 1 was placed in a high speed mixer, and then sodium silicate was added to the sand, while rotating the mixer. 30 seconds after the stirring, 20 Kg of the resulting mold sand mixture was packed into a metal flash under the same conditions as in Example 1 and then a $CO_2$ gas generated in a $CO_2$ gas generator was blown into the packed mold sand mixture to harden it and preparing a mold (the mold will be hereinafer referred to as Conventional Mold 2). Kind and amount of the binder used are shown in Table 7.

Comparative Example 3

The same Frementle sand as used in Example 1 was placed in a high speed mixer, and then toluene-sulfonic acid as a hardening agent for an organic binder, then, urea-furan resin as an organic binder, methyl silicate as a ceramic component, crude diphenylmethane diisocyanate as a hardening agent for the ceramic component, alumina as fine refractory powder for preventing penetration, magnesium oxide as a graphite spheroidization stabilizer, boric acid as a mold-intensifying agent for elevated temperatures and dextrin as a molding-improving agent were added to the sand, while rotating the mixer. 50 seconds after the stirring, 20 Kg of the resulting mold sand mixture was formed into a mold under the same conditions as in Example 1 (the mold will be hereinafer referred to as Conventional Mold 3). Kinds and amounts of the binder, hardening agents and additives used are shown in Table 7.

Procedures for the determination of workability, strength, etc.

1) Workable life: Time until mold sand mixtures obtained by adding the respective components to mold sand in the order shown in Examples and Comparative Examples, followed by mixing and stirring become difficult and unusable to preparation of molds due to progress of hardening, polymerization, etc. of the components themselves and the resulting failure to make molds.

2) Mold strength afer being left standing: Mold strength after being left standing at the normal temperature for 24 hours after the preparation of molds, measured by a penetration tester made by George Fisher Co.

3) Fushion-penetration resistance and penetration resistance:

Fushion-penetration resistance and penetration resistance of molds prepared in Examples 1 to 18 and Comparative Examples 1 to 3 were evaluated by pouring ordinary cast iron melt at 1,250° to 1,300° C. into each of the molds without any application of mold wash, thereby producing castings each having a weight of 8.8 Kg, removing sand attached to the casting surfaces by shot blasting after cooling and then inspecting the casting surfaces and mold surfaces to investigate the states of fusion-penetration and penetration with iron melt, where the fusion-penetration resistance and penetration resistance of the molds were marked by double circle "ⓔ" for the better resistance, single circle "○" for the good resistance and cross "x" for the poor resistance.

4) Mold strength for elevated temperatures:

Mold sand mixtures obtained in Examples 1 to 18 and comparative Examples 1 to 3 was prepared into cylindrical molds, outer diameter: 100 mm and height: 150 mm, and the cylinder molds were placed in an electric furance and heated at 1,000° C. for 5 minutes. After cooling, the strength was measured by the above-mentioned penetration tester.

5) Graphite spheroidization stability:

Nodular graphite cast iron melt was poured into the same molds as used in the test for fusion-penetration resistance and penetration resistance without any application of mold wash to the molds to produce castings each having a weight of 8.8 Kg. After cooling, the sand attached to the casting surfaces was removed by shot blast and the state of spheroidal graphite on the fracture surfaces of castings was inspected. All the Examples 1 to 18 showed better spheroidal graphitization without any graphite spheroidization stabilizer, as marked by double circle "ⓔ".

The results of Examples 1 to 18 show that the molds prepared from the present mold material compositions have a considerably high mold strength after being left standing and at an elevated temperature without using a mold wash, a penetration-preventing agent, a mold-intensifying agent for elevated temperatures, a mold formation-improving agent, a graphite spheroidization stabilizer, etc., as compared with the molds prepared from the conventional mold materials, and also have good fusion-penetration resistance and penetration resistance, and good graphite spheroidazation stability and shake-out.

On the other hand, Conventional mold 1, prepared from the conventional mold materials as shown in Comparative Example 1 has a good fusion-penetration resistance, but a poor penetration resistance, and thus the mold wash is indispensable. Conventional Mold 2 has a good mold strength at an elevated temperature and a good penetration resistance, but has a low mold strength after being left standing and a poor fusion-penetration resistance. Thus, mold wash is obviously required. Furthermore, it has a poor shake-out. Conventional Mold 3 has a good mold strength at an elevated temperature, a good penetration resistance and a good fusion-penetration resistance, but the hardening speed is considerably low, so that no smooth casting operation can be continued in practice.

TABLE 1

|  | Example 1 | Example 2 | Example 3 |
|---|---|---|---|
| Component (b): |  |  |  |
| amino | P-3 20% | P-4 20% | P-3 20% |
| non-amino | P-1 40% | P-1 40% | P-2 40% |
|  | P-5 40% | P-5 40% | P-5 40% |
| Hydroxyl value [mgKOH/g] | 692 | 588 | 584 |
| Solvent | SOL-1 20% | SOL-1 20% | SOL-1 20% |
| Component (d) | TEDA L-33 | TEDA L-33 | TEDA L-33 |

TABLE 1-continued

|  | Example 1 | Example 2 | Example 3 |
|---|---|---|---|
| Amount [g/component (b)] | 0.3 | 0.3 | 0.3 |
| Amount [%/sand] | 0.4 | 0.4 | 0.4 |
| Component (a) | MR-200 | MR-200 | MR-200 |
| Solvent | SOL-2 15% | SOL-2 15% | SOL-2 15% |
| Amount [g/sand] | 0.5 | 0.5 | 0.5 |
| Component (c) | SI-1 | SI-1 | SI-1 |
| Amount [g/sand] | 0.2 | 0.2 | 0.2 |
| Workable time [second] | 180 | 190 | 205 |
| Mold take-off time [min] | 7 | 8 | 8 |
| Mold strength after being left standing [Kg/cm$^2$] | 70 | 68 | 66 |
| Mold strength at elevated temperature [Kg/cm$^2$] | 35 | 33 | 27 |
| Fusion-penetration resistance | ⓔ | ⓔ | ⓔ |
| Penetration resistance | ⓔ | ⓔ | ⓔ |
| Shake-out | ○ | ⓔ | ⓔ |
| Graphite spheroidization stability | ⓔ | ⓔ | ⓔ |

Hydroxyl value in Section for Component (b) relates to that of the solvent-free component, whereas the amount contains those of solvent and component (d). The amount of component (a) contains that of solvent.

TABLE 2

|  | Example 4 | Example 5 | Example 6 |
|---|---|---|---|
| Component (b): |  |  |  |
| amino | P-4 20% | P-3 20% | P-4 20% |
| non-amino | P-2 40% | P-1 40% | P-1 40% |
|  | P-5 40% | P-5 40% | P-5 40% |
| Hydroxyl value [mgKOH/g] | 480 | 692 | 588 |
| Solvent | SOL-1 20% | SOL-1 20% | SOL-1 20% |
| Component (d) | TEDA L-33 | DEEA | DEEA |
| Amount [g/component (b)] | 0.3 | 0.3 | 0.3 |
| Amount [%/sand] | 0.4 | 0.4 | 0.4 |
| Component (a) | MR-200 | MR-200 | MR-200 |
| Solvent | SOL-2 15% | SOL-2 15% | SOL-2 15% |
| Amount [g/sand] | 0.5 | 0.5 | 0.5 |
| Component (c) | SI-1 | SI-2 | SI-2 |
| Amount [g/sand] | 0.2 | 0.2 | 0.2 |
| Workable time [second] | 220 | 178 | 190 |
| Mold take-off time [min.] | 9 | 7 | 7 |
| Mold strength after being left standing [Kg/cm$^2$] | 63 | 72 | 70 |
| Mold strength at elevated temperature [Kg/cm$^2$] | 25 | 37 | 35 |
| Fusion-penetration resistance | ⓔ | ⓔ | ⓔ |
| Penetration resistance | ○ | ⓔ | ⓔ |
| Shake-out | ⓔ | ○ | ⓔ |
| Graphite spheroidization stability | ⓔ | ⓔ | ⓔ |

Hydroxyl value in Section for Component (b) relates to that of the solvent-free component, whereas the amount contains those of solvent and component (d). The amount of component (a) contains that of solvent.

TABLE 3

| | Example 7 | Example 8 | Example 9 |
|---|---|---|---|
| Component (b): | | | |
| amino | P-3 20% | P-4 20% | P-3 20% |
| non-amino | P-2 40% | P-2 40% | P-1 40% |
| | P-5 40% | P-5 40% | P-5 40% |
| Hydroxyl value [mgKOH/g] | 584 | 480 | 692 |
| Solvent | SOL-1 20% | SOL-1 20% | SOL-1 20% |
| Component (d) | DEEA | DEEA | DEEA |
| Amount [g/component (b)] | 0.3 | 0.3 | 0.3 |
| Amount [%/sand] | 0.4 | 0.4 | 0.4 |
| Component (a) | MR-200 | MR-200 | MR-200 |
| Solvent | SOL-2 15% | SOL-2 15% | SOL-2 15% |
| Amount [g/sand] | 0.6 | 0.6 | 0.5 |
| Component (c) | SI-3 | SI-3 | SI-4 |
| Amount [g/sand] | 0.3 | 0.3 | 0.3 |
| Workable time [second] | 195 | 210 | 180 |
| Mold take-off time [min.] | 7 | 8 | 7 |
| Mold strength after being left standing [Kg/cm$^2$] | 70 | 68 | 72 |
| Mold strength at elevated temperature [Kg/cm$^2$] | 32 | 30 | 38 |
| Fusion-penetration resistance | ⊚ | ⊚ | ⊚ |
| Penetration resistance | ⊚ | ⊚ | ⊚ |
| Shake-out | ⊚ | ⊚ | ○ |
| Graphite spheroidization stability | ⊚ | ⊚ | ⊚ |

Hydroxyl value in Section for Component (b) relates to that of the solvent-free component, whereas the amount contains those of solvent and component (d). The amount of component (a) contains that of solvent.

TABLE 4

| | Example 10 | Example 11 | Example 12 |
|---|---|---|---|
| Component (b): | | | |
| amino | P-4 20% | P-3 20% | P-4 20% |
| non-amino | P-1 40% | P-2 40% | P-2 40% |
| | P-5 40% | P-5 40% | P-5 40% |
| Hydroxyl value [mgKOH/g] | 588 | 584 | 480 |
| Solvent | SOL-1 20% | SOL-1 20% | SOL-1 20% |
| Component (d) | DEEA | DEEA | DEEA |
| Amount [g/component (b)] | 0.3 | 0.3 | 0.3 |
| Amount [%/sand] | 0.4 | 0.4 | 0.4 |
| Component (a) | MR-200 | MR-200 | MR-200 |
| Solvent | SOL-2 15% | SOL-2 15% | SOL-2 15% |
| Amount [g/sand] | 0.5 | 0.6 | 0.6 |
| Component (c) | SI-4 | SI-1 | SI-1 |
| Amount [g/sand] | 0.3 | 0.2 | 0.2 |
| Workable time [second] | 190 | 200 | 210 |
| Mold take-off time [min.] | 7 | 8 | 8 |
| Mold strength after being left standing [Kg/cm$^2$] | 69 | 68 | 67 |
| Mold strength at elevated temperature [Kg/cm$^2$] | 36 | 30 | 28 |
| Fusion-penetration resistance | ⊚ | ⊚ | ⊚ |
| Penetration resistance | ⊚ | ⊚ | ⊚ |
| Shake-out | ⊚ | ⊚ | ⊚ |
| Graphite spheroidization stability | ⊚ | ⊚ | ⊚ |

Hydroxyl value in Section for Component (b) relates to that of the solvent-free component, whereas the amount contains those of solvent and component (d). The amount of component (a) contains that of solvent.

TABLE 5

| | Example 13 | Example 14 | Example 15 |
|---|---|---|---|
| Component (b): | | | |
| amino | P-3 20% | P-4 20% | P-3 20% |
| non-amino | P-1 40% | P-1 40% | P-2 40% |
| | P-5 40% | P-5 40% | P-5 40% |
| Hydroxyl value [mgKOH/g] | 692 | 588 | 584 |
| Solvent | SOL-1 20% | SOL-1 20% | SOL-1 20% |
| Component (d) | DEEA | DEEA | DMEA |
| Amount [g/component (b)] | 0.3 | 0.3 | 0.3 |
| Amount [%/sand] | 0.4 | 0.4 | 0.4 |
| Component (a) | T-80 | T-80 | T-80 |
| Solvent | SOL-2 15% | SOL-2 15% | SOL-2 15% |
| Amount [g/sand] | 0.5 | 0.5 | 0.5 |
| Component (c) | SI-1 | SI-1 | SI-1 |
| Amount [g/sand] | 0.2 | 0.2 | 0.2 |
| Workable time [second] | 175 | 174 | 170 |
| Mold take-off time [min.] | 8 | 8 | 9 |
| Mold strength after being left standing [Kg/cm$^2$] | 70 | 67 | 65 |
| Mold strength at elevated temperature [Kg/cm$^2$] | 35 | 33 | 28 |
| Fusion-penetration resistance | ⊚ | ⊚ | ⊚ |
| Penetration resistance | ⊚ | ⊚ | ⊚ |
| Shake-out | ○ | ⊚ | ⊚ |
| Graphite spheroidization stability | ⊚ | ⊚ | ⊚ |

Hydroxyl value in Section for Component (b) relates to that of the solvent-free component, whereas the amount contains those of solvent and component (d). The amount of component (a) contains that of solvent.

TABLE 6

| | Example 16 | Example 17 | Example 18 |
|---|---|---|---|
| Component (b): | | | |
| amino | P-4 20% | P-4 20% | P-4 40% |
| non-amino | P-2 40% | P-2 5% | P-2 40% |
| | P-5 40% | P-5 75% | P-5 20% |
| Hydroxyl value [mgKOH/g] | 480 | 640 | 672 |
| Solvent | SOL-1 20% | SOL-1 20% | SOL-1 20% |
| Component (d) | DMEA | DEEA | DEEA |
| Amount [g/component (b)] | 0.3 | 0.3 | 0.3 |
| Amount [%/sand] | 0.4 | 0.4 | 0.4 |
| Component (a) | T-80 | MR-200 | MR-200 |
| Solvent | SOL-2 15% | SOL-2 15% | SOL-2 15% |

TABLE 6-continued

|  | Example 16 | Example 17 | Example 18 |
|---|---|---|---|
| Amount [g/sand] | 0.5 | 0.5 | 0.5 |
| Component (c) | SI-1 | SI-1 | SI-1 |
| Amount [g/sand] | 0.2 | 0.2 | 0.2 |
| Workable time [second] | 170 | 150 | 160 |
| Mold take-off time [min.] | 9 | 6 | 7 |
| Mold strength after being left standing [Kg/cm$^2$] | 65 | 73 | 75 |
| Mold strength at elevated temperature [Kg/cm$^2$] | 27 | 37 | 38 |
| Fusion-penetration resistance | ⊙ | ⊙ | ⊙ |
| Penetration resistance | ⊙ | ⊙ | ⊙ |
| Shake-out | ⊙ | ○ | ○ |
| Graphite spheroidization stability | ⊙ | ⊙ | ⊙ |

Hydroxyl value in Section for Component (b) relates to that of the solvent-free component, whereas the amount contains those of solvent and component (d). The amount of component (a) contains that of solvent.

TABLE 7

|  | Comp. Ex. 1 | Comp. Ex. 2 | Comp. Ex. 3 |
|---|---|---|---|
| Binder/weight ratio | R-1 | R-2 | R-1/1.0 SI-1/0.4 |
| Amount [%/sand] | 1.0 | 6.0 | 1.4 |
| Hardening agent/weight ratio | TS | CO$_2$ | TS/0.7 MR-200/0.9 |
| Amount [%/sand] | 0.5 | — (gas hardening) | 1.6 |
| Additive/weight ratio |  |  | T-1/2.0 T-2/0.3 T-3/1.5 T-4/1.0 |
| Amount [%/sand] |  |  | 4.8 |
| Workable time [second] | 150 | — | 480 |
| Mold take-off time [min.] | 8 | — | 2400 |
| Mold strength after being left standing [Kg/cm$^2$] | 26 | 9 | 70 |
| Mold strength at elevated temperature [Kg/cm$^2$] | 14 | 27 | 30 |
| Resistance | ○ | X | ⊙ |
| Fusion-penetration resistance | X | ○ | ⊙ |
| Shake-out | ○ | X | ⊙ |

What is claimed is:

1. A method for preparing a self-hardening mold for producing further molds useful for producing metal castings, which method comprises mixing a mold material composition comprising:

100 parts by weight of molding sand, about 0.1 to 6 parts by weight of a component (a), about 0.1 to 4 parts by weight of a component (b), about 0.05 to 2.0 parts by weight of a component (c) as SiO$_2$, and about 0.01 to 0.5 parts by weight of a component (d) on the basis of 100 parts by weight of component (b), wherein the component (a) comprises a crude diphenylmethanediisocyanate or derivatives thereof; the component (b) comprises an aliphatic polyetherpolyol mixture having a hydroxyl value of about 350 to 1600, comprising an aliphatic aminopolyetherpolyol having a hydroxyl value of about 400 to 1600 and 2 to 6 functional groups, obtained by an addition reaction of aliphatic amine with alkylene oxide, and an aliphatic non-aminopolyetherpolyol having a hydroxyl number of about 100 to 800 and from 2 to 8 functional groups, the aliphatic polyetherpolyol mixture comprising from 5 to 80% by weight of the aliphatic aminopolyetherpolyol, from 95 to 20% by weight of the aliphatic non-aminopolyetherpolyol and from 5 to 85% by weight of primary hydroxyl-containing polyetherpolyol, wherein the content of the primary hydroxyl-containing non-aminopolyetherpolyol in the component (b) is at least 5% by weight; the component (c) is selected from the group consisting of silicate ester, its hydrolysis products, a water dispersion-type silica sol, an alcohol dispersion-type silica sol and mixtures thereof; and the component (d) is a catalyst for urethanization, and preparing a mold from the resulting mixture.

2. The method of claim 1, wherein the component (a) is a crude diphenylmethanediisocyanate.

3. The mold prepared by the method of claim 1.

4. The mold prepared by the method of claim 2.

* * * * *